(12) United States Patent
Yasuda et al.

(10) Patent No.: US 10,125,277 B2
(45) Date of Patent: Nov. 13, 2018

(54) SLIDING MEMBER

(71) Applicant: DAIDO METAL COMPANY LTD., Nagoya-shi (JP)

(72) Inventors: Erina Yasuda, Inuyama (JP); Hiroki Kobayakawa, Inuyama (JP); Kenji Nimura, Inuyama (JP)

(73) Assignee: DAIDO METAL COMPANY LTD., Nagoya-Shi (JP)

( * ) Notice: Subject to any disclaimer, the term of this patent is extended or adjusted under 35 U.S.C. 154(b) by 0 days.

(21) Appl. No.: 15/492,194

(22) Filed: Apr. 20, 2017

(65) Prior Publication Data
US 2017/0313893 A1 Nov. 2, 2017

(30) Foreign Application Priority Data
Apr. 28, 2016 (JP) .................................. 2016091880

(51) Int. Cl.
| | |
|---|---|
| *C09D 7/61* | (2018.01) |
| *C09D 7/40* | (2018.01) |
| *C09D 5/00* | (2006.01) |
| *C09D 179/08* | (2006.01) |
| *C10M 125/02* | (2006.01) |
| *C10M 125/22* | (2006.01) |
| *F16C 33/20* | (2006.01) |
| *C08K 3/04* | (2006.01) |
| *C08K 3/08* | (2006.01) |
| *C08K 3/30* | (2006.01) |
| *F16C 17/02* | (2006.01) |

(52) U.S. Cl.
CPC ................ *C09D 7/61* (2018.01); *C09D 5/00* (2013.01); *C09D 7/69* (2018.01); *C09D 179/08* (2013.01); *C10M 125/02* (2013.01); *C10M 125/22* (2013.01); *F16C 33/201* (2013.01); *C08K 3/042* (2017.05); *C08K 3/08* (2013.01); *C08K 3/30* (2013.01); *C08K 2003/085* (2013.01); *C08K 2003/0806* (2013.01); *C08K 2003/0812* (2013.01); *C08K 2003/0837* (2013.01); *C08K 2003/3009* (2013.01); *C08K 2201/003* (2013.01); *C08K 2201/005* (2013.01); *C08K 2201/016* (2013.01); *C10M 2201/041* (2013.01); *C10M 2201/065* (2013.01); *C10M 2201/066* (2013.01); *F16C 17/02* (2013.01); *F16C 33/205* (2013.01); *F16C 33/206* (2013.01); *F16C 2360/22* (2013.01)

(58) Field of Classification Search
CPC . C08K 5/01; C08K 5/02; C08K 3/042; C08K 2003/3009; C08K 2003/385; C08K 2201/016; F16C 33/02; F16C 33/30; C09D 7/60; C09D 7/61; C09D 7/63; C09D 7/65; C09D 7/66; C09D 7/70
See application file for complete search history.

(56) References Cited

U.S. PATENT DOCUMENTS

| | | | |
|---|---|---|---|
| 2004/0137281 A1* | 7/2004 | Ishikawa ................. | C23C 14/06 428/702 |
| 2017/0081522 A1 | 3/2017 | Adam et al. | |

FOREIGN PATENT DOCUMENTS

| | | |
|---|---|---|
| DE | 102013227186 A1 | 7/2015 |
| JP | 2008240785 A | 10/2008 |
| JP | 2015077786 A | 4/2015 |
| JP | 2015-200339 A | 11/2015 |
| JP | 2016-98879 A | 5/2016 |

OTHER PUBLICATIONS

Extended European Search Report issued in corresponding European Application No. 17170357.2 dated Dec. 6, 2017, 18 pages.

* cited by examiner

*Primary Examiner* — Robert S Jones
(74) *Attorney, Agent, or Firm* — Snyder, Clark, Lesch & Chung, LLP

(57) ABSTRACT

Disclosed herein is a sliding member that has a coating layer serving as a sliding surface thereof so that even when foreign matter enters between the coating layer and a partner member, smoothness between them is maintained to prevent the occurrence of seizing. When the coating layer has an elastic recovery ratio of less than 60%, foreign matter that has entered between the coating layer and the sliding surface of a partner member is efficiently embedded in the coating layer. When the coating layer is formed of a resin composition, the resin composition contains a binder resin, a solid lubricant, and metal particles having a Young's modulus of 10 GPa or more but 100 GPa or less.

5 Claims, 3 Drawing Sheets

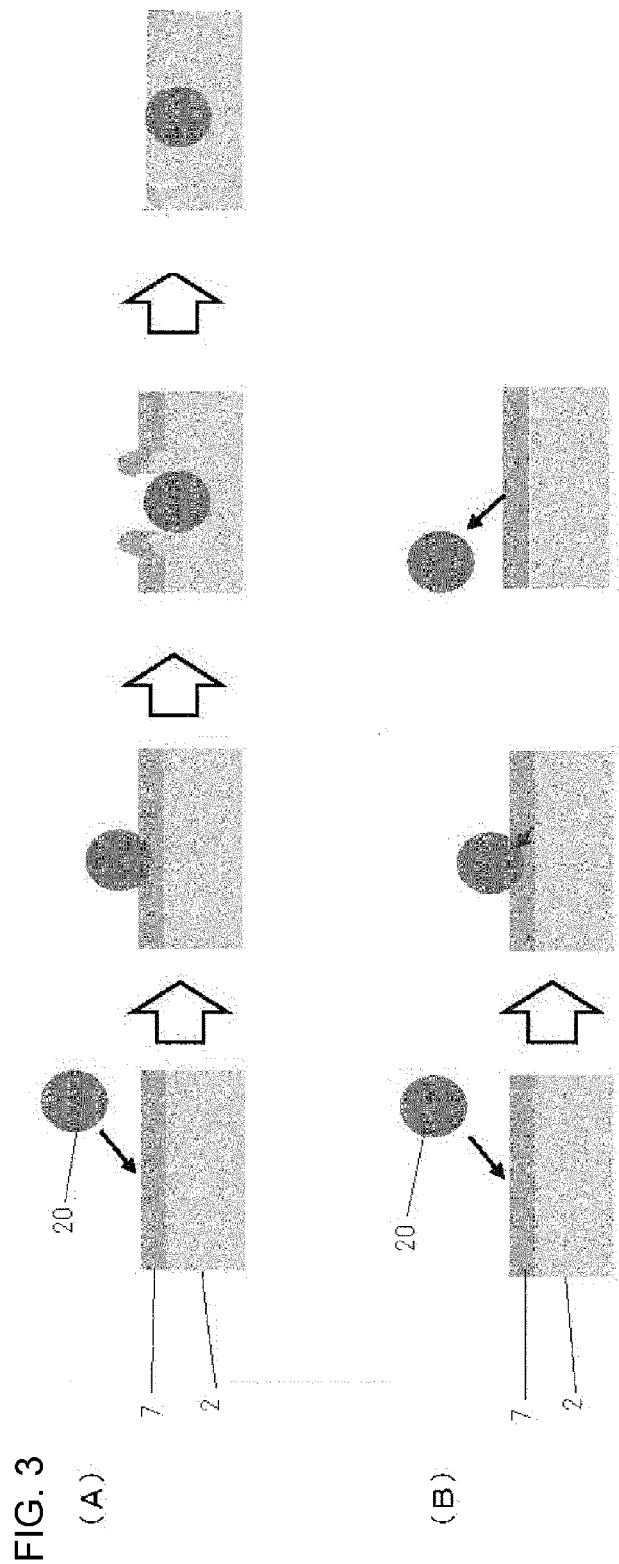

SLIDING MEMBER

TECHNICAL FIELD

The present invention relates to improvements in a sliding member.

DESCRIPTION OF THE BACKGROUND ART

The sliding surface of a bearing applied to the engine of a vehicle is required to have high abrasion resistance and seizing resistance. As one of solutions to this requirement, a technique has been proposed in which the sliding surface of a bearing is coated with a resin composition (see JP 2008-240785 A).

The resin composition contains a binder resin and a solid lubricant. When a load is applied to a coating layer formed of the resin composition, the solid lubricant itself is deformed (e.g., cleaved), more specifically, slip occurs between its crystal planes so that the stress of the resin composition is relaxed. The binder resin generally has low heat conductivity, and therefore it is intended to improve the heat conductivity of the entire coating layer by adding a heat-conductive filler to the resin composition (JP 2008-240785 A).

Please refer to JP 2015-077786 A that discloses techniques relating to the present invention.

SUMMARY

A coating layer formed of a resin composition is always required to have improved durability.

For example, diesel engines for heavy trucks and the like as well as gasoline engines have been required to frequently repeat start and stop to achieve lower fuel consumption. As compared to a bearing for gasoline engine, a heavier specific load is applied to a bearing for diesel engine at a lower peripheral speed, and therefore maintenance of high lubricity between its shaft and bearing, that is, seizing resistance is required. Further, a vehicle with a diesel engine generally travels a longer distance between maintenances than a vehicle with a gasoline engine, which increases the possibility of entry of foreign matter between a shaft and a bearing.

If foreign matter enters between a shaft and a bearing and is kept present at the interface between them, smooth sliding between them is inhibited, which may cause seizing.

If the coating layer can only be elastically deformed, foreign matter that has entered between the coating layer and a partner member cannot be crawled into (cannot be embedded in) the coating layer, and is therefore kept present at the interface between them. This undesirably causes seizing.

The present inventors have intensively studied to solve the problem of entry of foreign matter into a sliding member such as a bearing having a coating layer.

According to a study by the present inventors, when the coating layer has an elastic recovery ratio of less than 60%, foreign matter that has entered between the coating layer and the sliding surface of a partner member is efficiently embedded in the coating layer. Therefore, the time during which the foreign matter is present between the coating layer and the sliding surface of the partner member is significantly reduced so that lubricity between them is maintained and seizing is prevented. Based on the above, a first aspect of the present invention is defined as follows.

A sliding member comprising: a base material; and a coating layer provided on a surface of the base material, wherein the coating layer has an elastic recovery ratio of less than 60%.

In the sliding member according to the first aspect of the present invention defined above, the coating layer has an elastic recovery ratio of less than 60%. Therefore, even when entering between the coating layer and the sliding surface of a partner member, foreign matter is embedded in the coating layer so that lubricity between them is maintained, which improves seizing resistance.

Here, the elastic recovery ratio is obtained based on ISO 14677-1. Roughly speaking, "maximum indentation depth (hmax)" and "indentation depth after load removal (hf)" are measured to calculate (hmax−hf)/(hmax).

It is to be noted that the lower limit of the elastic recovery ratio is not particularly limited, but may be 20% or more. The elastic recovery ratio is preferably 25% or more but 50% or less.

When the coating layer is formed of a resin composition, a problem of its elastic deformation is likely to occur. Therefore, according to a second aspect of the present invention, the coating layer is formed of a resin composition having a predetermined composition. That is, in the sliding member according to the first aspect of the present invention, the coating layer is formed of a resin composition, and the resin composition comprises a binder resin, a solid lubricant, and metal particles having a Young's modulus of 10 GPa or more but 100 GPa or less.

When the resin composition contains metal particles having a Young's modulus of 10 GPa or more but 100 GPa or less, the elastic recovery ratio of the entire resin composition is easily controlled to be less than 60% due to the ability of the metal particles themselves to plastically deform.

Further, in order to reliably plastically deform the metal particles to reliably allow the resin composition itself to have an elastic recovery ratio of less than 60%, an inclination of the metal particles is preferably 25 degrees or less. That is, a third aspect of the present invention is defined as follows. In the sliding member according to the second aspect of the present invention, an inclination of the metal particles in the coating layer is 25 degrees or less.

Here, the inclination of the metal particles refers to an included angle between the major axes of the metal particles in a plane parallel to the thickness direction of the coating layer and the surface of the coating layer. When the inclination is smaller, the major axes of the metal particles are closer to parallel to the surface of the coating layer. The major axes of the metal particles used herein may be the major axes of equivalent ellipses whose area, moment of area, and moment of inertia of area are equal to those of the cross-sectional shapes of the metal particles in a plane parallel to the thickness direction of the coating layer. If the inclination of the metal particles exceeds 25 degrees, the elastic recovery ratio of the entire coating layer tends to increase, and therefore it is difficult to control the elastic recovery ratio to be less than 60%. The metal particles preferably have a flaky shape.

FIG. 2 schematically shows the relationship between the inclination of the metal particles and the elastic recovery ratio of the coating layer.

As shown in FIG. 2A, when the major axes of the metal particles are parallel to the surface of the coating layer, the metal particles are greatly plastically deformed due to the deformation of the surface of the coating layer resulting from foreign matter so that the surface of the coating layer is also kept deformed and the surface shape of the coating layer is less likely to recover.

On the other hand, as shown in FIG. 2B, when the major axes of the metal particles are vertical to the surface of the coating layer, the volume of plastic deformation of the metal particles is smaller than that of deformation of the surface of the coating layer resulting from foreign matter. Therefore, the deformed surface of the coating layer is recovered by elastic deformation function as the original function of the binder resin.

Further, in order to more smoothly cause plastic deformation of the metal particles, the solid lubricant comprises particles smaller than the metal particles to reduce the influence of the solid lubricant on the plastic deformation of the metal particles. That is, a fourth aspect of the present invention is defined as follows. In the sliding member according to the second or third aspect of the present invention, the solid lubricant comprises particles, and in a plane parallel to a thickness direction of the coating layer, an average length of major axes of the particles of the solid lubricant is ½ or less of an average length of major axes of the metal particles.

In the sliding member according to the fourth aspect of the present invention defined above, the solid lubricant comprises particles sufficiently smaller than the metal particles, and therefore even when interfering with the metal particles, the solid lubricant is less likely to prevent the plastic deformation of the metal particles.

Here, the major axes of the particles of the solid lubricant are defined in the same manner as in the case of the metal particles described above.

Further, in order to more smoothly cause plastic deformation of the metal particles 11, the flaky metal particles 11 are allowed to have a shape closer to a regular polygon or a circle. That is, a fifth aspect of the present invention is defined as follows. In the sliding member according to any one of the second to fourth aspects of the present invention, the metal particles 11 have an aspect ratio of 5 or less.

In the sliding member according to the fifth aspect of the present invention defined above, the metal particles 11 have a shape close to a square or circle when viewed from the surface of the coating layer, which eliminates the need to control the orientation of the metal particles 11 in a direction perpendicular to the thickness direction of the metal particles 11 with respect to a direction parallel to the surface of the coating layer. Therefore, the elastic recovery ratio can be evenly maintained over the entire surface of the coating layer.

Here, the aspect ratio of the metal particles 11 refers to the ratio between the major axis length to the minor axis length of the metal particles when the coating layer is viewed in the thickness direction of the coating layer. The major and minor axes of the metal particles used herein may be the major and minor axes of equivalent ellipses whose area, moment of area, and moment of inertia of area are equal to those of the projection shapes of the metal particles in a plane perpendicular to the thickness direction of the coating layer.

A sixth aspect of the present invention is defined as follows. That is, in the sliding member according to any one of the first to fifth aspects of the present invention, a ratio H/T of a hardness H (HV) of the base material to a film thickness T (μm) of the coating layer is 5 to 30.

In the sliding member according to the sixth aspect of the present invention defined above, the film thickness of the coating layer is optimum for the hardness of the base material, and therefore foreign matter is reliably embedded.

BRIEF DESCRIPTION OF DRAWINGS

FIG. 3 is a schematic view showing a manner in which foreign matter is embedded in a coating layer.

DESCRIPTION OF EMBODIMENTS

Figure 1:
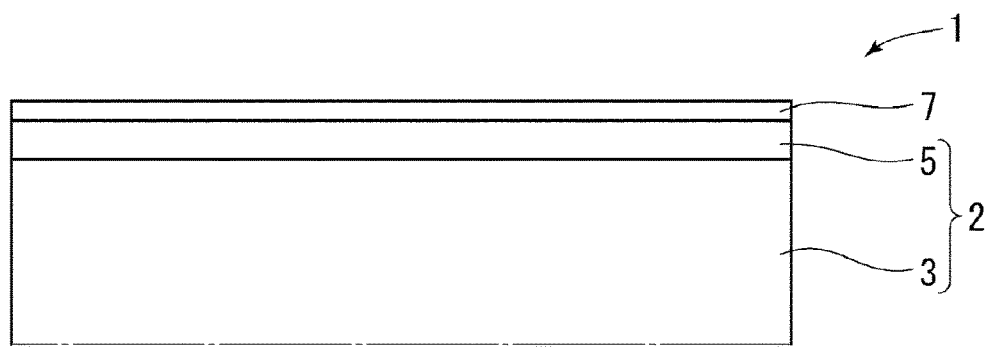
FIG. 1 is a sectional view showing the structure of a sliding member according to an embodiment of the present invention.

FIG. 1 shows a layered structure of a sliding member 1 according to an embodiment of the present invention.

This sliding member 1 has a structure in which a coating layer 7 formed of a resin composition is laminated on the surface of a base material 2. The vertical direction in FIG. 1 corresponds to the thickness direction of each of the layers.

In the sliding member 1 comprising a bearing, the base material 2 thereof comprises a cylindrical or semi-cylindrical steel plate layer 3. If necessary, a bearing alloy layer (hereinafter, simply abbreviated as "alloy layer") 5 made of an alloy of Al, Cu, Sn, or the like is provided on the surface (inner peripheral surface) of the steel plate layer 3. Although not shown, the base material 2 may be one having, on the surface (inner peripheral surface) of the alloy layer 5, a Sn-, Bi-, or Pb-group wet or dry plating layer or a layer having a resin. The layer having a resin is different from the coating layer 7.

In order to improve adhesion between the base material 2 and the coating layer 7, the inner peripheral surface of the base material 2 may be subjected to surface roughening. The surface roughening may be performed by chemical surface treatment such as combination of alkaline etching and pickling or mechanical surface treatment such as abrasive blasting.

Figure 2:
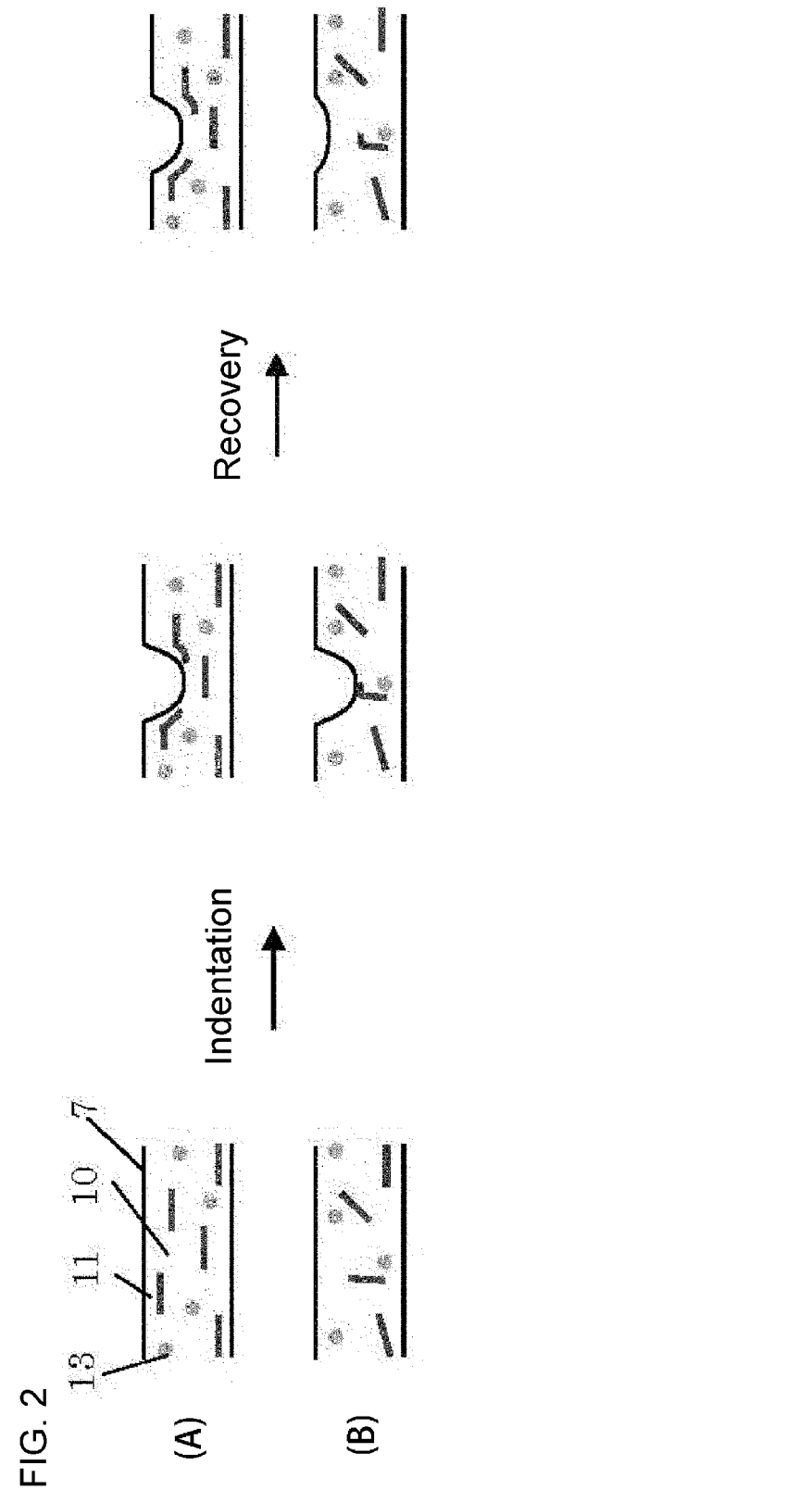
FIG. 2 schematically shows the relationship between the inclination of metal particles and the elastic recovery ratio of a coating layer.

As shown in FIG. 2, the resin composition constituting the coating layer 7 contains a binder resin 10, metal particles 11, and a solid lubricant 13.

The binder resin 10 contained in the resin composition binds the coating layer 7 to the base material 2, and disperses and fixes the metal particles 11 and the solid lubricant 13. A resin material used for the binder resin 10 may be appropriately selected depending on, for example, the intended use of the sliding member 1. When the sliding member 1 is used for vehicle engines, the resin material may be at least one of polyimide resins, polyamideimide resins, epoxy resins, phenol resins, polyamide resins, fluorine resins, and elastomers, and may be a polymer alloy.

The thickness of the coating layer 7 may be arbitrarily designed, and may be, for example, 1 μm or more but 40 μm or less.

A method for laminating the coating layer 7 may also be arbitrarily selected. Examples of the method to be used include pad printing, screen printing, air spray painting, airless spray painting, electrostatic painting, tumbling, squeezing, rolling, and roll coating.

The metal particles 11 used in this embodiment have a Young's modulus of 10 GPa or more but 100 GPa or less. If the Young's modulus of the metal particles 11 is less than 10 GPa, the metal particles 11 are too soft, which may deteriorate the durability of the coating layer 7. On the other hand, if the Young's modulus of the metal particles 11 exceeds 100 GPa, the metal particles 11 themselves are difficult to plastically deform.

Examples of a metal having such a Young's modulus include Al, Sn, Bi, Ag, Pb, Zn, and compounds thereof.

It is to be noted that the metal particles 11 more preferably have a Young's modulus of 30 GPa to 80 GPa.

The metal particles 11 contained in the coating layer 7 of the sliding member 1 according to this embodiment have a flat flaky shape. When the metal particles 11 have such a shape, it is easy to control the metal particles 11 so that the angle between the thickness direction thereof and the thickness direction of the coating layer 7 is 45° or less. The metal particles 11 in the surface of the coating layer 7 as a sliding surface have an aspect ratio of 5 or less. When the major-axis length of the metal particles 11 is kept 5 times or less the minor-axis length of the metal particles 11, the metal particles 11 are likely to be isotropic in the planar direction (direction perpendicular to the thickness direction) thereof. Therefore, when such metal particles 11 are contained in the coating layer 7, the elastic recovery ratio of the coating layer 7 is easily made uniform over the entire surface of the coating layer 7.

It is to be noted that the metal particles 11 more preferably have an aspect ratio of 1.0 to 4.5.

It is to be noted that the metal particles 11 contained in the coating layer 7 preferably have a major-axis length of 3 to 10 μm in the planar direction thereof and a thickness of 0.1 to 1 μm.

In the coating layer 7 containing the metal particles 11, the angle between the major axes of the metal particles 11 in a plane parallel to the thickness direction of the coating layer 7 and the surface of the coating layer 7 is 25 degrees or less. It is to be noted that in this embodiment, the sizes of the metal particles etc. are measured using analysis software (Image-Pro Plus).

This makes it possible to keep the flaky metal particles 11 lying down. Therefore, the metal particles 11 can be easily plastically deformed by a force applied to the coating layer 7 in the thickness direction thereof, which makes it possible to control the elastic recovery ratio of the coating layer 7 to be a predetermined value or less (see FIG. 2(A)). That is, the surface shape of the coating layer 7 is not recovered more than necessary (see FIG. 2(B)).

It is to be noted that the inclination of the metal particles 11, that is, the angle between the major axes of the metal particles 11 in a plane parallel to the thickness direction of the coating layer 7 and the surface of the coating layer 7 can be controlled by the viscosity of a coating liquid as a precursor of the resin composition, drying conditions, production conditions of the coating layer 7, etc.

The metal particles 11 contained in the resin composition constituting the coating layer 7 may comprise one type of metal particles or two or more types of metal particles. When the amount of the entire resin composition constituting the coating layer 7 is defined as 100 vol. %, the amount of the metal particles 11 contained in the resin composition may be 1 vol. % or more but 20 vol. % or less. The amount of the metal particles 11 contained in the resin composition is preferably 2 vol. % or more but 10 vol. % or less.

The material of the solid lubricant 13 may also be appropriately selected depending on the intended use of the sliding member. For example, the material of the solid lubricant 13 may be at least one selected from molybdenum disulfide, tungsten disulfide, h-BN (h-boron nitride), PTFE (polytetrafluoroethylene), graphite, melamine cyanurate, carbon fluoride, phthalocyanine, Graphene Nanoplatelets, fullerene, ultrahigh molecular weight polyethylene (manufactured by Mitsui Chemicals, Inc. under the trade name of "MIPELON"), and Nε-lauroyl-L-lysine (manufactured by Ajinomoto Co., Inc. under the trade name of "AMIHOPE").

The amount of the solid lubricant 13 contained in the resin composition may also be arbitrarily selected depending on the intended use of the sliding member. For example, when the amount of the entire resin composition constituting the coating layer 7 is defined as 100 vol. %, the amount of the solid lubricant 13 contained in the resin composition may be 20 vol. % or more but 70 vol. % or less. The amount of the solid lubricant 13 contained in the resin composition is preferably 25 vol. % or more but 45 vol. % or less.

In the cross-section of the coating layer that is a plane parallel to the thickness direction of the coating layer 7, the solid lubricant 13 contained in the binder resin 10 together with the metal particles 11 preferably comprises particles whose average length of major axes is ½ or less of the average length of major axes of the metal particles 11. When the solid lubricant 13 interferes with the metal particles 11, for example, when the solid lubricant 13 is in contact with the upper side or lower side of the metal particles 11 in the thickness direction of the coating layer 7, there is a possibility of that the solid lubricant 13 prevents the metal particles 11 from being plastically deformed when a force is applied to the coating layer 7 in a direction perpendicular to the sliding surface. Here, when the particles of the solid lubricant 13 have a smaller size than the metal particles 11, the solid lubricant 13 is less likely to prevent deformation of the metal particles 11 even when the solid lubricant 13 interferes with the metal particles 11.

The metal particles 11 and the solid lubricant 13 can be appropriately combined depending on the intended use or purpose of the sliding member. Further, the mixing ratio (vol. %) between them is preferably metal particles 11:solid lubricant 13=1:2 to 14. The mixing ratio is more preferably metal particles 11:solid lubricant 13=1:3 to 8.

The thickness of the coating layer 7 can also be arbitrarily selected depending on the intended use or purpose of the sliding member and further the raw materials of the resin composition constituting the coating layer 7.

It is to be noted that the ratio H/T of the hardness H (HV) of the material of the base material 2 that is in contact with the coating layer 7 to the thickness T (μm) of the coating layer 7 is preferably 5 to 30. This makes it possible, when foreign matter such as iron powder enters between the surface (sliding surface) of the coating layer 7 and the surface (sliding surface) of a partner member (not shown), to allow the foreign matter to crawl into the coating layer 7 and further into the base material 2 so that the foreign matter is embedded at an appropriate depth and the coating layer 7 can maintain its surface smoothness.

More specifically, in the structure shown in FIG. 1, the thickness of the coating layer 7 is preferably 1 to 20 μm, more preferably 3 to 15 μm. The hardness of the alloy layer 5 is preferably 30 to 130 HV, more preferably 50 to 100 HV.

The coating layer 7 of the sliding member according to the present invention has an elastic recovery ratio of less than 60%, and therefore as schematically shown in FIG. 3(A), when a force is applied to the coating layer 7 by the entry of foreign matter 20, the foreign matter easily breaks through the coating layer 7 and is then embedded in the relatively soft base material 2. Then, the surface (sliding surface) of the coating layer 7 is smoothened by friction with a partner member (not shown).

On the other hand, if the elastic recovery ratio of the coating layer 7 is as high as 60% or more, as schematically shown in FIG. 3(B), foreign matter 20 that has entered is repelled by the coating layer 7, and is therefore not embedded inside the coating layer 7 so that the foreign matter 20 is kept present at the interface between the coating layer 7 and the partner member. The foreign matter 20 damages the coating layer 7 itself or impairs the smoothness of the coating layer 7, which causes seizing.

TABLE 1

|  | Elastic recovery ratio | Time elapsing before seizing (mm) |
|---|---|---|
| Example 9 | 59 | 200 |
| Comparative Example 1 | 91 | 50 |
| Comparative Example 2 | 63 | 150 |

TABLE 2

|  |  | Solid lubricant | | Metal particles | | | | | | | | | | elapsing before seizing (min) |
|---|---|---|---|---|---|---|---|---|---|---|---|---|---|---|
|  | Binder resin | Type | Amount (vol %) | Particle diameter A (μm) | Type | Young's modulus (GPa) | Amount (vol %) | Particle diameter B (μm) | Aspect ratio | Inclination | H/T | A/B | Elastic recovery ratio | Others |  |
| Example 1 | PAI | MoS2 | 30 | 2 | Al | 70 | 10 | 5 | 1.6 | 15 | 10 | 0.4 | 28 | — | 300 |
| Example 2 | PAI | MoS2 | 30 | 2 | Sn | 50 | 5 | 5 | 1.2 | 18 | 28 | 0.4 | 35 | — | 280 |
| Example 3 | PAI | MoS2 | 40 | 1.5 | Al | 70 | 5 | 8 | 3 | 12 | 32 | 0.2 | 43 | — | 270 |
| Example 4 | PI | MoS2 | 30 | 5 | Sn | 50 | 3 | 12 | 4.8 | 10 | 42 | 0.4 | 52 | — | 260 |
| Example 5 | PBI | WS2 | 40 | 2 | Al | 70 | 8 | 5 | 10 | 18 | 35 | 0.4 | 49 | $SiO_2$ | 240 |
| Example 6 | PAI | WS2 | 30 | 1.5 | Sn | 50 | 3 | 3 | 8 | 12 | 40 | 0.5 | 50 | $Al_2O_3$ | 240 |
| Example 7 | PI | Gr | 20 | 2 | Bi | 32 | 1 | 2 | 6 | 18 | 38 | 1 | 55 | — | 220 |
| Example 8 | PAI | Gr | 30 | 5 | Ag | 83 | 3 | 3 | 10 | 23 | 40 | 1.7 | 56 | SiC | 210 |
| Example 9 | PAI | MoS2 | 50 | 5 | Cu | 110 | 2 | 5 | 6 | 28 | 42 | 1 | 59 | — | 200 |

Hereinbelow, a method for producing the sliding member 1 will be described.

The surface of the base material 2 prepared by a known method is washed, and is then, if necessary, subjected to surface roughening and further washed. On the other hand, the metal particles 11, the solid lubricant 13, and other additives used depending on the intended use are mixed with a solution prepared by dissolving the binder resin in a solvent to prepare a coating liquid. Then, the coating liquid is applied to the surface of the base material 2 and calcined to form the coating layer 7 formed of a resin composition. The present inventors have found out that the inclination of the metal particles 11 contained in the coating layer 7 can be easily controlled to be 25 degrees or less by making the solid content of the coating liquid lower than a known ratio or by making the drying rate lower than a known rate.

Experimental Examples

Hereinbelow, experimental examples of the present invention will be described.

A base material 2 comprising a steel plate layer 3 and an aluminum bearing alloy layer 5 pressure-welded to the steel plate layer 3 was processed to have a half shell shape. After the base material 2 was processed into a predetermined shape, the surface of the alloy layer 5 was washed for degreasing and impurity removal. Then, the surface was subjected to abrasive blasting for surface roughening. A previously-prepared resin composition coating liquid was applied by spraying so as to have a thickness of 5 μm. After drying, calcining was further performed at 200° C. to 300° C. for 30 minutes to 120 minutes to obtain sliding members of Examples and Comparative Examples (see Tables 1 and 2). It is to be noted that Comparative Example 1 used PBI as a binder resin, but did not use a solid lubricant and metal particles. Comparative Example 2 was performed under the same conditions as Example 9 except that metal particles were not used.

PAI, PI, PBI, and PA refer to a polyamideimide resin, a polyimide resin, polybenzoimidazole, and a polyamide resin, respectively. Gr refers to graphite.

As can be seen from Table 1, when a seizing test was performed under conditions described later, the time that elapses before seizing was 200 minutes or longer when the elastic recovery ratio was less than 60%.

As can be seen from Table 2, the Young's moduli of the metal particles 11 used in Examples 1 to 8 were 90 GPa or less but 30 GPa or more. Further, the inclination of the major axes of the metal particles 11 was 25 degrees or less.

It is apparent from the results of Examples 1 to 6 that the ratio A/B of the average length A of major axes of particles of the solid lubricant to the average length B of major axes of the metal particles 11 is preferably 0.5 or less. Further, it is apparent from the results of Examples 1 to 4 that the aspect ratio of the metal particles 11 is preferably 5.0 or less. Further, it is apparent from the results of Examples 1 and 2 that H/T representing the relationship between H and T is preferably 30 or less.

It is to be noted that the seizing test was performed under the following conditions:

rotation speed: 3500 rpm lubricant oil: 5 W-30 oil-feeding pressure: 0.4-0.5 MPa shaft material: S45C.

The present invention is not limited to the above description of the embodiment according to the present invention. Various modified embodiments are also included in the present invention as long as they are easily conceivable by those skilled in the art and do not depart from the scope of the claims.

The above embodiment has been described with reference to a case where the sliding member is a bearing, but the present invention is applicable also to other sliding members.

What is claimed is:

1. A sliding member comprising:
a base material; and
a coating layer provided on a surface of the base material,
wherein the coating layer has an elastic recovery ratio of less than 60%, and
wherein a ratio H/T of a hardness H (Hv) of the base material to a film thickness T (μm) of the coating layer ranges from 5 to 30.

2. The sliding member according to claim 1, wherein the coating layer is formed of a resin composition, and the resin composition comprises a binder resin, a solid lubricant, and metal particles having a Young's modulus ranging from 10 GPa or more to 100 GPa or less.

3. The sliding member according to claim 2, wherein an inclination of the metal particles in the coating layer is 25 degrees or less.

4. The sliding member according to claim 3, wherein the solid lubricant comprises particles whose average length of major axes is ½ or less of an average length of major axes of the metal particles.

5. The sliding member according to claim 3, wherein the metal particles have an aspect ratio of 5 or less.

* * * * *